Jan. 22, 1935.　　　W. A. READY　　　1,989,063
SHOVEL AND METHOD OF MAKING THE SAME

Filed April 28, 1932

Inventor:
William A. Ready,
by Emery, Booth, Varney & Townsend
Attys

Patented Jan. 22, 1935

1,989,063

UNITED STATES PATENT OFFICE 1,989,063

SHOVEL AND METHOD OF MAKING THE SAME

William A. Ready, Brookline, Mass., assignor to Ames Baldwin Wyoming Co., Parkersburg, W. Va., a corporation of Delaware Application April 28, 1932, Serial No. 608,031

4 Claims. (Cl. 76—113)

My invention aims to provide improvements in shovels and the like.

In the drawing which illustrates a preferred embodiment of my invention:—

Figure 1:
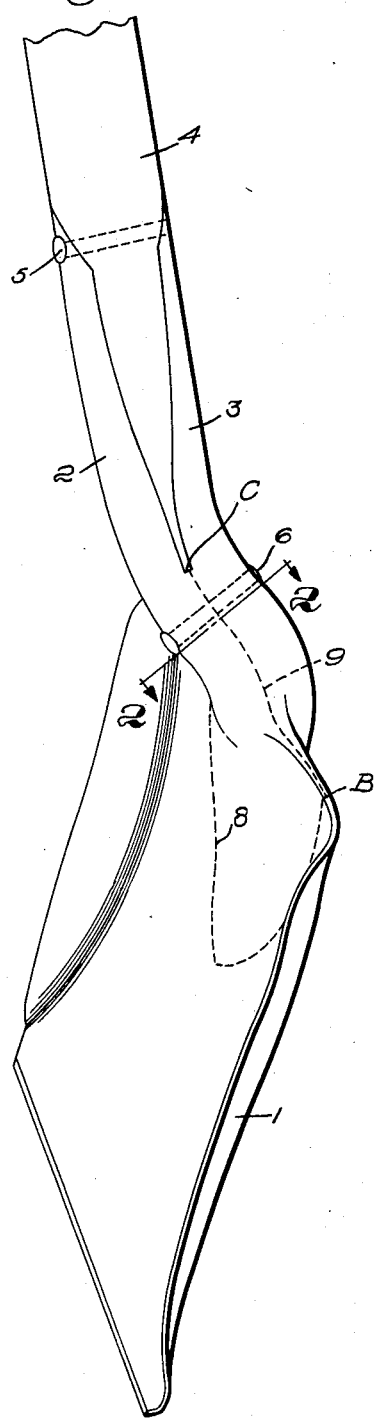
Figure 1 is a perspective view of a shovel and a portion of a handle showing my improved socket construction as applied to a handle.

In the specific embodiment of my invention selected for illustration by the annexed drawing, there is shown a shovel having an improved socket construction. It should be understood, however, that this improved socket construction may be used in connection with other types of hand implements wherein the demands are substantially similar. My invention relates particularly to shovels constructed with a blade 1 and a front strap 2 and back strap 3 in combination with a handle 4 fitted into the socket provided by the front and back straps and secured therein by rivets 5 and 6, as best illustrated in Figure 1. In one type of shovel the straps are so shaped along the portion nearer to the blade that their edges are presented in juxtaposition, the lower portion of the socket thus assuming the form of a cranked tube horizontally split. In the last mentioned construction the straps are relatively stiff by virtue of their channel shape. However, they act independently of one another. A prying force applied to the handle of the shovel while it is supported on the heel of the blade tends to straighten the upper strap across the angle which it makes with the body of the blade and to cause the lower strap to bulge at the angle at the rear of the blade, the two straps separating along the sides. The shovel may thus flatten out, losing its lift. Not infrequently failure occurs by breakage of the front strap at the angle. Loosening of the rivets and breakage of the wooden handle due to play following enlargement of the rivet holes also occur.

Figure 2:
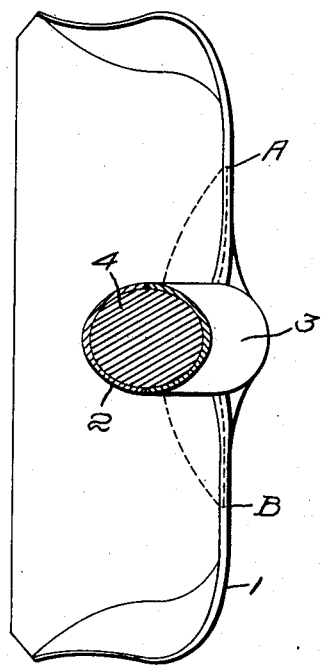
Fig. 2 is a section taken on the line 2—2 of Figure 1.
Figure 3:
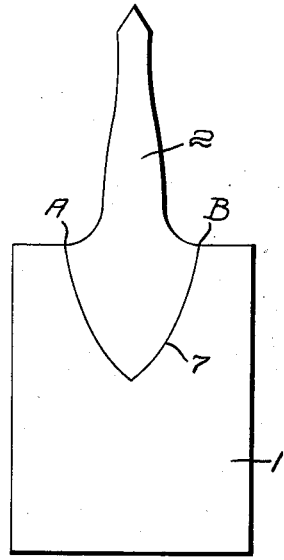
Fig. 3 is a front elevation of the shovel blade and strap blanks showing the manner in which the front strap is attached to the shovel blade and showing the shape of the front strap before welding.

In accordance with my invention I provide a shovel having an adequate lift and a strong socket free from such drawbacks as have been enumerated by providing initially independent straps as heretofore, shaping them to the desired profile and, at least at the lower portion thereof, to semi-tubular section and then uniting the edges by welding to form a unitary whole in which either strap supports and reinforces the other. The particular shovel structure which I have selected for illustration has a front strap provided with a heart shaped portion of substantial area (Fig. 3). The heart shaped portion has its edge 7 welded to the blade 1 from a point beginning at A and extending throughout its length to a point B (Fig. 3) forming the customary frog at the front of the blade. This structure is old and well known to those skilled in the art. The back strap 3 may be welded to the blade portion or it may be formed integral therewith as desired. Heretofore, there has been no connection between the edges of the front and back straps beginning at points A and B (Figs. 2 and 3) and extending upwardly along the sides of the socket structure. I preform the straps both to the proper longitudinal profile to provide the desired lift for the shovel and at their lower portions to semi-tubular section and thereafter weld along the edges beginning at the points A and B and extending to points C, as clearly illustrated in Figure 1. In this manner the two strap portions are united to form a rigid portion which will maintain its shape and which cannot be materially distorted in the normal use of the shovel.

Since in my improved construction it is desirable to pre-form the socket into its curved shape lengthwise and its rounded shape crosswise, I have found that it is desirable to steam the end of the handle and then bulldoze it into the pre-formed socket which may be held by suitable jaw members during the attaching operation. After the handle is pushed into the socket the rivet 6 is secured in place to assist the weld in holding the strap members 2 and 3 together at the rigid portion. The rivet 5 is also attached to clamp the upper portions of the straps 2 and 3 tightly into engagement with the handle 4.

My improved socket construction greatly reduces the liability of the handle 4 becoming loosened in the socket and relative to the rivets 5 and 6. The length of the yieldable portions of the straps is reduced and the rigid portion prevents movement relative to each other when the shovel is placed under stress. Actual tests have shown that, while retaining the desirable features of the so-called plain back shovels long hitherto known, a shovel constructed as here described has a strength far in excess of such shovels, not only improving it for use in fields in which they have hitherto been used but permitting its use for purposes for which they have been considered inadequate.

The dotted line 8 which is heart shaped in Figure 1 represents the location of the edge portion 7 before the heart shaped portion of the strap 2 is welded into the blade portion. The dotted line 9, also indicated in Figure 1, shows where the parts have been welded along meeting edges to provide my improved rigid socket portion. So far as I am aware the edges indicated by the line 9 have not heretofore been welded together even along the upper edge of the blade.

While I have illustrated and described a preferred embodiment of my invention, I do not wish to be limited thereby, because the scope of my invention is best defined by the following claims.

I claim:

1. A shovel of the plain back type having a blade with an integrally joined extension from its rear edge shaped to semi-tubular section and a cooperating member overlying the rear central portion of the blade and joined thereto to provide a frog therewith, said member having an extension shaped to semi-tubular section, said extensions being cranked to provide the desired lift in the shovel, the edges of said extensions being welded together to provide an unbroken tubular socket opening to the frog and a permanent handle received in the socket.

2. A shovel of the plain back type having a blade with an integrally joined extension from its rear edge shaped to semi-tubular section and a cooperating member comprising an enlarged head overlying the rear central portion of the blade and an extension therefrom, said head being integrally united to the blade about its margin and along the rear edge of the blade and the extension shaped to semi-tubular section, said extensions being cranked to provide the desired lift in the shovel, the edges of the extensions being welded together to provide an unbroken tubular socket and a permanent handle received in the socket.

3. The method of constructing a shovel of the type having a back strap extending therefrom and a front strap having an enlarged head overlying the shovel blade and marginally secured thereto which comprises shaping the straps at least in the portions thereof adjacent the blade to a profile providing the desired lift and to semi-tubular section, welding the edges of the semi-tubular portions together, forcing a handle into the tubular socket so provided and securing it therein.

4. The method of constructing a shovel of the type having a back strap extending therefrom and a front strap having an enlarged head overlying the shovel blade and marginally secured thereto which comprises shaping the straps at least in the portions thereof adjacent the blade to a profile providing the desired lift and to semi-tubular section, welding the edges of the semi-tubular portions together and welding the edges of the head adjacent said extensions to the rear edge of the blade, forcing a handle into the tubular socket so provided and securing it therein.

WILLIAM A. READY.